INVENTORS
D. C. BICHEL
L. R. BARQUIST
B. A. ZMUDA

United States Patent Office 3,412,735
Patented Nov. 26, 1968

3,412,735
DIVIDERS FOR A COMBINE SEPARATOR
Darwin C. Bichel, East Moline, Ill., Larry R. Barquist, Bettendorf, Iowa, and Benedict A. Zmuda, East Moline, Ill., assignors to Deere & Company, Moline, Ill., a corporation of Delaware
Filed Oct. 20, 1965, Ser. No. 498,788
10 Claims. (Cl. 130—21)

ABSTRACT OF THE DISCLOSURE

A self-propelled combine has an upwardly and rearwardly inclined chain and slat type conveyor for moving the grain falling from the concave and straw walkers rearwardly to a stationary pan which deflects the grain onto the chaffer and sieve. A plurality of fixed upright fore-and-aft dividers above the conveyor limit lateral shifting of the grain thereon. Upright fore-and-aft dividers are also provided on the pan and the top chaffer or sieve to limit lateral shifting of grain thereon.

---

This invention relates to the grain separating and cleaning mechanism in a combine and more particularly to improved means for preventing the lateral shifting of grain in such a separating and cleaning mechanism.

A typical combine includes a header which removes the crop from the field and feeds it to a transverse threshing cylinder having an associated concave, the crop being distributed relatively evenly across the width of the cylinder. Most of the grain is separated from the straw by the cylinder and the concave, and, together with the chaff and other foreign material, is conventionally deposited across the width of a fore-and-aft raddle-type conveyor having substantially the same width as the cylinder.

The conveyor moves the grain and chaff rearwardly to a cleaning mechanism, which conventionally includes at least one sieve-like member of chaffer through which the grain drops while the chaff is blown out the rear of the combine by an upward air blast through said chaffer. The chaffer has substantially the same width as the conveyor and like the conveyor is transversely level during level operation of the combine. For proper cleaning, the grain must be relatively evenly distributed across the width of the cleaning mechanism, since a concentration of grain at any point on the chaffer interferes with the air blast through the grain, and conversely, where the material on the chaffer is too sparse, the air blast can blow some of the grain out of the combine with the chaff.

The distribution of grain on the cleaning mechanism becomes a problem when the combine is operated on hillsides or on uneven terrain, since the conveyor and chaffer tilt with the combine and the grain shifts to the downhill side of both the conveyor and the chaffer. A hillside-type combine, having a mechanism for maintaining the separator body level, is one answer to the problem, although the added expense of such mechanisms is often not justified. It has also previously been proposed to provide fore-and-aft ribs on the conveyor or fore-and-aft dividers on the chaffer to prevent lateral shifting of the grain on the conveyor.

According to the present invention, means are provided for completely channeling the grain in a fore-and-aft direction from the threshing cylinder to the rear portion of the chaffer so that the grain will not concentrate on the downhill side of the cleaning mechanism in sidehill operation of the combine.

A more specific object of the invention is to provide fore-and-aft dividers over the separator conveyor to prevent lateral shifting of the grain on the conveyor and further to provide fore-and-aft dividers on the chaffer to prevent lateral shifting of grain on the chaffer.

The invention also contemplates the use of a flat, pan-like member or scalper at the discharge end of the conveyor, above the front portion of the chaffer, to receive the material from the conveyor and distribute it in a relatively even pattern on the chaffer in order that the front end of the chaffer does not become overloaded.

Another object is to provide a plurality of upright, fore-and-aft dividers on such a scalper, and further to interconnect such conveyor, scalper, and chaffer dividers in fore-and-aft alignment to completely channel the grain from the conveyor to the rear portion of the chaffer.

Still another object is to provide such conveyor, scalper, and chaffer dividers which are simple and inexpensive to manufacture, and which can be installed as optional equipment on new combines, or easily installed on combines already in the field.

These and other objects will become apparent from the following detailed description and accompanying drawings wherein.

Figure 1:
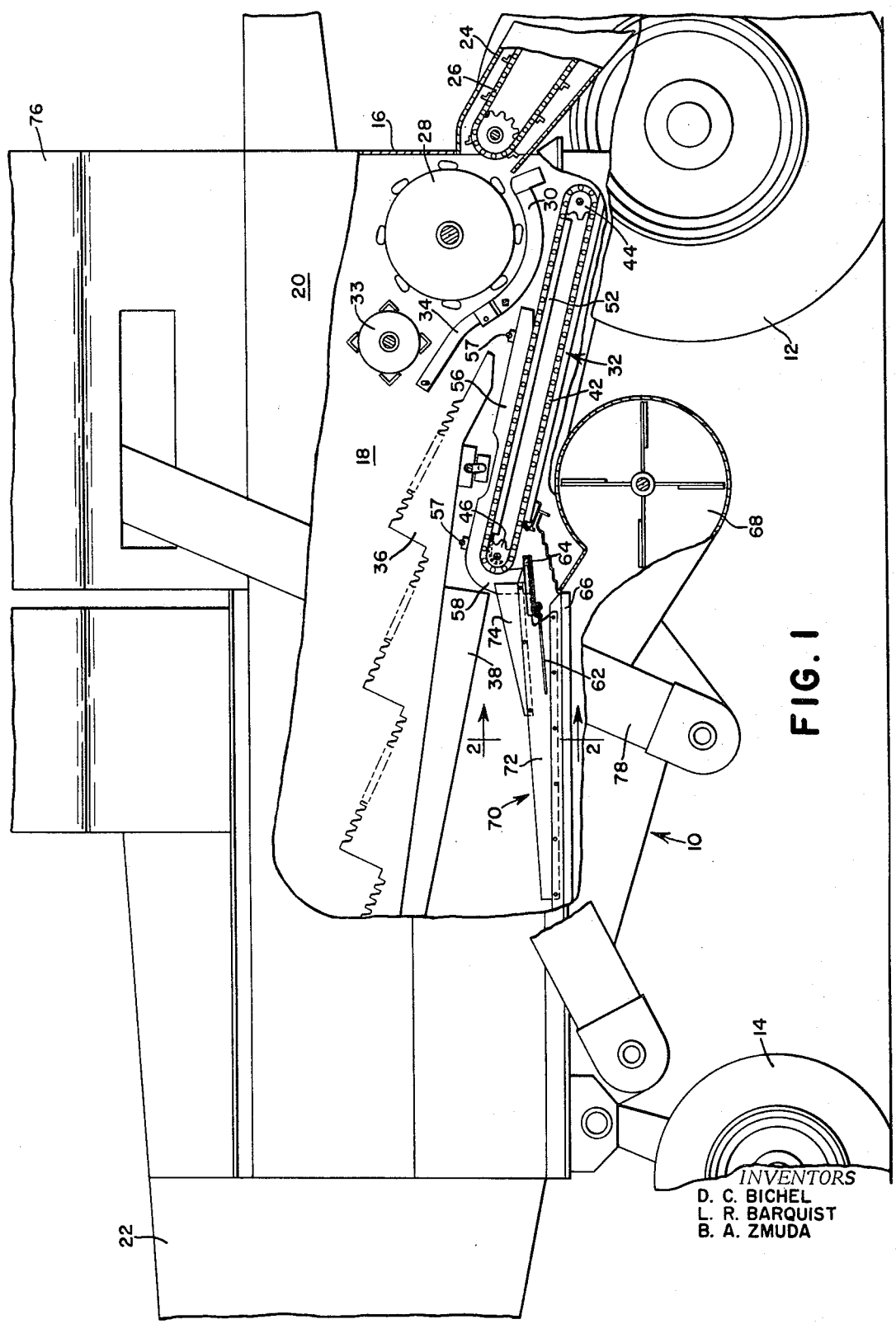
FIG. 1 is a fragmentary side elevation of a combine with a portion of the side panel removed to expose the grain separating mechanism.
Figure 2:
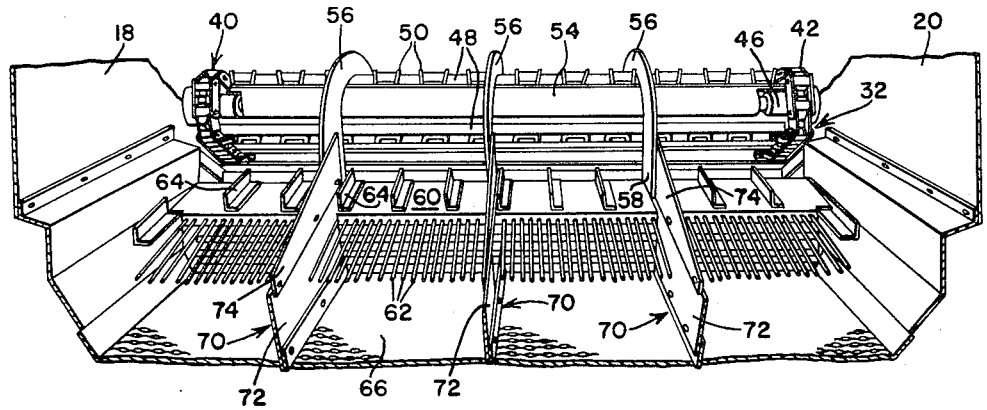
FIG. 2 is a rear fragmentary, perspective view showing the rear end of the separator conveyor and the forward portion of the chaffer as viewed along the line 2—2 in FIG. 1.
Figure 3:
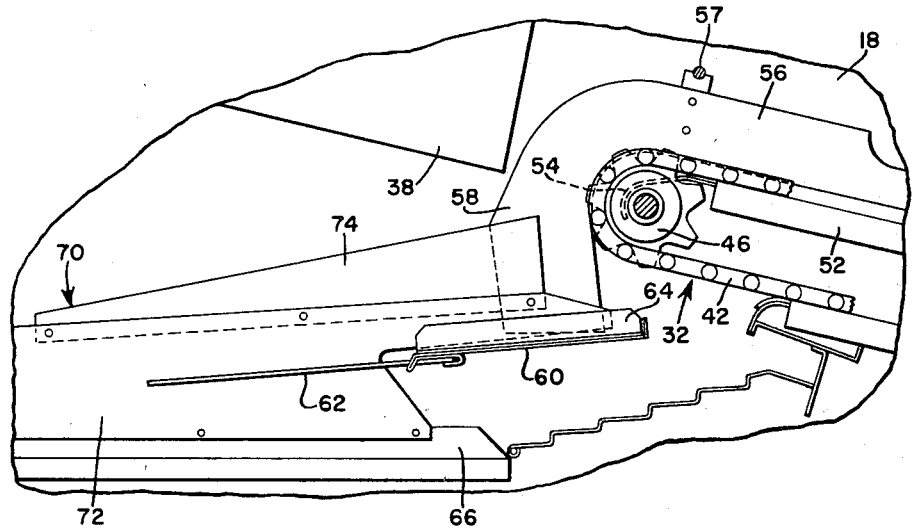
FIG. 3 is an enlarged, fragmentary, side elevation of the rear end of the separator conveyor and the forward end of the chaffer shown in FIG. 1.

The combine chosen for purpose of illustration includes a main separator body 10 mounted for advance over a field on front and rear wheels 12 and 14 respectively, and including a front wall 16, opposite side walls 18 and 20, and a rearwardly extending discharge hood 22 (partly shown) open toward the ground. A transverse header (not shown) extends forwardly from the body 10 and removes the crop from the field in the conventional manner, the harvested crop being moved rearwardly through a feeder house 24 and an opening in the front wall 16 by a conveyor 26 to a transverse threshing cylinder 28 having an associated concave 30.

Most of the grain is separated by the threshing cylinder 28 and, along with the chaff and other foreign material, drops through the concave 30 onto a fore-and-aft raddle-type conveyor 32 which moves the material rearwardly and upwardly within the body 10. The threshing cylinder throws the unseparated grain and remaining crop material rearwardly to a beater 33 which moves the material over a separator grate 34 and onto a plurality of side-by-side straw walkers 36, the straw walkers agitating the material to separate the remaining grain while moving the straw rearwardly through the discharge hood 22 from which it falls to the ground. The grain separated by the straw walkers 36 falls onto grain-return pans 38, which depend from the straw walkers and direct the grain forwardly to the discharge end of the conveyor 32.

The conveyor 32 includes a pair of transversely spaced endless chains 40 and 42 trained around sprocketed front and rear transverse rollers 44 and 46 and interconnected by a plurality of spaced, transverse slats 48, each slat having a plurality of U-shaped members 50 open toward the direction of slat movement. The rollers 44 and 46 are driven so that the upper slats move rearwardly along a relatively flat member 52, moving the grain rearwardly along said member to its rear or discharge end 54 which extends downwardly around the rear roller 46.

A plurality of parallel, upright, fore-and-aft dividers 56 are suspended proximately above the conveyor 32 on a pair of transverse members 57 extending between the sides 18 and 20. The dividers 56 have downwardly curved rear ends 58 which extend around and below the discharge end of the conveyor, and their forward ends underlie the concave 30, so that the material on the conveyor 32 is channeled between the dividers 56.

A relatively flat pan-like member or scalper 60 extends between the sides 18 and 20 below the discharge end of the conveyor and carries a plurality of rearwardly extending fingers 62 and a plurality of transversely spaced fore-and-aft upright dividers 64. The grain, chaff, and foreign material fall off the discharge end of the conveyor onto the scalper 60 and are deflected rearwardly onto the fingers 62, which allow the material to sift onto a relatively flat upper sieve-like member or chaffer 66 in a relatively even pattern. The chaffer 66 is mounted between the sides 18 and 20 for fore-and-aft oscillation to agitate the material. A centrifugal-type blower 68 directs a blast of air upwardly and rearwardly through the chaffer 66, blowing the chaff rearwardly through the discharge hood 22 while the heavier grain drops through the openings in the chaffer 66.

The chaffer 66 is provided with a plurality of upright, fore-and-aft, dividers 70, each divider 70 including a divider member 72 extending upwardly from the chaffer and a divider extension 74 mounted on and extending upwardly from the forward portion of each member 72. The forward end of each divider 70 overlies the scalper or pan 60, each divider extending between the fingers 62 and being laterally adjacent to a scalper divider 64 and overlapping the rear end 58 of a conveyor divider 56. While the conveyor dividers 66 and chaffer dividers 70 are longitudinally aligned, additional scalper dividers 64 are provided between the adjacent sets of conveyor and chaffer dividers.

Generally, one or more underlying sieves (not shown) receive the grain from the chaffer, the sieves having smaller openings than the chaffer to provide additional cleaning of the grain. The clean grain, dropping through the sieves, is collected at the bottom of the combine body and elevated to a grain tank 76 via a clean grain elevator 78.

In sidehill operation of the combine, the grain, chaff, and foreign material dropping through the concave 30 onto the conveyor 32 are moved rearwardly by the conveyor slats 48, the U-shaped members 50 preventing the lateral shifting of the material along the slats, while the fore-and-aft dividers 56 restrict the lateral shifting of the material over the slats. The rear ends 58 of the dividers 56 also prevent the lateral movement of the material after it leaves the conveyor 32. When the material reaches the scalper 60, the scalper dividers prevent the lateral shifting of the material. After the material leaves the scalper 60, its lateral movement is restricted by the chaffer dividers 70. The overlap between the rear end 58 of the conveyor dividers 56 and the forward end of the chaffer dividers 70 prevents the downhill movement of material at the junction of the two dividers even though the chaffer dividers 70 oscillate with the chaffer 66. Thus, the grain is completely channeled in a fore-and-aft direction after it leaves the threshing mechanism until it drops through the chaffer 66.

While three fore-and-aft conveyor dividers 56 and chaffer dividers 70 are shown in the drawings, a greater or lesser number of dividers could be provided within the scope of the invention, the number of dividers depending on the width of the separating mechanism as well as the degree of slope on which the combine is operated.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a combine having a transverse threshing cylinder, a fore-and-aft endless-type conveyor having an upper surface adapted to receive material from the cylinder and move it rearwardly within the combine, and a relatively flat sieve-like member below the discharge end of the conveyor adapted to receive the material from the conveyor, the combination therewith of a plurality of elongated, upright, fore-and-aft dividers mounted above the upper surface of the conveyor and fixed relative thereto for restricting the lateral movement of the material on the conveyor, and a plurality of elongated, upright, fore-and-aft dividers extending upwardly from the sieve-like member for restricting the lateral movement of the material on the sieve-like member.

2. In a combine having a main separator body, a transverse threshing mechanism mounted in the body, a fore-and-aft endless-type conveyor having an upper surface adapted to receive material from the threshing mechanism and move it rearwardly within the body, and a relatively flat sieve-like member mounted in the body for fore-and-aft oscillating motion and adapted to receive material from said conveyor, the combination therewith of a plurality of elongated, upright, fore-and-aft dividers operably mounted within the body above the material-receiving surface of the conveyor and fixed relative thereto for restricting lateral movement of material on said surface, and a plurality of elongated, upright, fore-and-aft dividers extending upwardly from said sieve-like member for restricting lateral movement of material in said member, the rear end of the conveyor dividers overlapping the forward end of the sieve dividers.

3. In a combine having a main separator body, a transverse threshing mechanism mounted in the body, a fore-and-aft endless type conveyor having an upper surface adapted to receive material from the threshing mechanism and move it rearwardly within the body, a relatively flat sieve-like member mounted in the body below the discharge end of said conveyor, and a relatively flat pan-like member mounted in the body between the discharge end of the conveyor and said sieve-like member and extending the width of said conveyor for receiving the material from the conveyor and deflecting it onto the sieve member, the combination therewith of a plurality of elongated, upright, fore-and-aft dividers mounted above the upper surface of the conveyor and fixed relative thereto for restricting the lateral movement of material on the conveyor, a plurality of elongated, upright, fore-and-aft dividers extending upwardly from the sieve-like member for restricting the lateral movement of material on the sieve-like member, and a plurality of fore-and-aft, upright dividers extending upwardly from said pan-like member.

4. The invention defined in claim 3 wherein the rear end of the conveyor dividers extend rearwardly and downwardly around the discharge end of said conveyor and proximate to said pan-like member.

5. The invention defined in claim 4 wherein the conveyor dividers and sieve dividers are substantially in fore-and-aft alignment, the rear end of each conveyor divider overlapping the forward end of each sieve divider forming a plurality of fore-and-aft, laterally adjacent channels above said conveyor, pan-like member, and sieve-like member.

6. In a combine having a main separator body, a threshing mechanism mounted in the body, fore-and-aft conveyor means mounted in the body for moving material from the threshing mechanism, a relatively flat pan mounted within the body below the discharge end of the conveyor means and adapted to receive material from the conveyor means and deflect it rearwardly to a relatively flat sieve-like member mounted in the body below said pan, the combination therewith of a plurality of upright, fore-and-aft dividers mounted on and extending upwardly from said pan and a plurality of elongated, upright, fore-and-aft dividers mounted on and extending upwardly from said sieve member.

7. The invention defined in claim 6 wherein the forward end of each sieve member divider overlies said pan member, each sieve-like member being laterally adjacent to a pan divider.

8. In a combine having a main separator body, a threshing mechanism mounted in the body, an endless-type fore-and-aft conveyor mounted within the body and having an upper surface for moving material rearwardly from the threshing mechanism, the combination therewith of a plurality of fixed, elongated, upright, fore-and-aft dividers mounted within the body above and disconnected from the upper surface of the conveyor for restricting lateral movement of the material thereon.

9. In a combine having a main separator body, a threshing mechanism mounted in the body, an endless-type fore-and-aft conveyor mounted within the body and having an upper surface for moving material rearwardly from the threshing mechanism, and a relatively flat pan mounted within the body below the discharge end of the conveyor and adapted to receive material from the conveyor and deflect it rearwardly, the combination therewith of a plurality of fixed, elongated, upright, fore-and-aft dividers mounted within the body above and disconnected from the upper surface of the conveyor for restricting lateral movement of the material thereon; and a plurality of upright, fore-and-aft dividers mounted on and extending upwardly from said pan.

10. The invention defined in claim 9 wherein the conveyor dividers extend rearwardly and downwardly around the rear end of said conveyor to said pan.

References Cited

UNITED STATES PATENTS

| | | | |
|---|---|---|---|
| 1,917,536 | 7/1933 | McIntire | 130—21 |
| 2,939,581 | 6/1960 | Ashton | 209—319 X |
| 3,092,116 | 6/1963 | Stroburg et al. | 130—27.18 |

ANTONIO F. GUIDA, *Primary Examiner.*